(12) United States Patent
Okazaki et al.

(10) Patent No.: US 11,945,264 B2
(45) Date of Patent: Apr. 2, 2024

(54) TIRE WEAR PREDICTION SYSTEM, TIRE WEAR PREDICTION PROGRAM, TIRE WEAR PREDICTION METHOD AND DATA STRUCTURE

(71) Applicant: BRIDGESTONE CORPORATION, Tokyo (JP)

(72) Inventors: Naoto Okazaki, Tokyo (JP); Shoji Oida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 741 days.

(21) Appl. No.: 17/053,852

(22) PCT Filed: May 10, 2019

(86) PCT No.: PCT/JP2019/018670
§ 371 (c)(1),
(2) Date: Nov. 9, 2020

(87) PCT Pub. No.: WO2019/216399
PCT Pub. Date: Nov. 14, 2019

(65) Prior Publication Data
US 2021/0229504 A1  Jul. 29, 2021

(30) Foreign Application Priority Data
May 10, 2018  (JP) .................................. 2018-091256

(51) Int. Cl.
*B60C 11/24*  (2006.01)
*G01M 7/02*  (2006.01)

(52) U.S. Cl.
CPC ................................ *B60C 11/246* (2013.01)

(58) Field of Classification Search
CPC .......... G01M 7/02; G01M 17/02; B60C 19/00; B60C 19/12; B60C 23/04; B60C 23/061; B60C 11/24
See application file for complete search history.

(56) References Cited

U.S. PATENT DOCUMENTS 6,212,947 B1   4/2001  Shimizu et al.
10,753,828 B2  8/2020  Tamura et al.
(Continued)

FOREIGN PATENT DOCUMENTS

DE   10 2005 052 476 A1  5/2007
JP         3277155 B2     4/2002
(Continued)

OTHER PUBLICATIONS

Search Report dated Oct. 19, 2021, issued by the European Patent Office in application No. 19798846.2.
(Continued)

*Primary Examiner* — Tan Q Nguyen
(74) *Attorney, Agent, or Firm* — Sughrue Mion, PLLC (57) ABSTRACT

A tire wear prediction system (100) is provided with a wear prediction unit (110) for predicting a wear state of a tire mounted at a predetermined wheel position of a vehicle based on the traveling state of the vehicle, a change history acquisition unit (120) for acquiring a change history including the rotation of the wheel position on which the tire is mounted or a content of replacement with another tire, and a wear state correction unit (140) for correcting a reference of the wear state of the tire predicted by the wear prediction unit (110) based on the change history. The wear prediction unit (110) predicts the wear state of the tire based on the reference of the wear state corrected by the wear state correction unit (140).

9 Claims, 5 Drawing Sheets

(56) References Cited

U.S. PATENT DOCUMENTS

| | | | | |
|---|---|---|---|---|
| 2012/0191495 A1* | 7/2012 | McIntosh | ............... | G07C 5/085 |
| | | | | 705/7.11 |
| 2013/0158777 A1* | 6/2013 | Brauer | ................... | G06Q 10/20 |
| | | | | 701/31.4 |
| 2018/0253109 A1* | 9/2018 | Fontaine | .............. | G05D 1/0291 |
| 2019/0255891 A1* | 8/2019 | Makke | ..................... | G01N 3/56 |
| 2019/0265129 A1* | 8/2019 | Tamura | ................... | B60C 19/00 |
| 2020/0031184 A1* | 1/2020 | Ukegawa | ............... | G06Q 10/20 |

FOREIGN PATENT DOCUMENTS

| | | | |
|---|---|---|---|
| JP | 3277156 | A | 4/2002 |
| JP | 3320653 | B2 | 9/2002 |
| JP | 2005-29130 | A | 2/2005 |
| JP | 2005-349966 | A | 12/2005 |
| JP | 2014-227124 | A | 12/2014 |
| JP | 2015-051704 | A | 3/2015 |
| JP | 2017-156295 | A | 9/2017 |
| JP | 2017-218097 | A | 12/2017 |
| JP | 2018-020752 | A | 2/2018 |
| WO | 2009/080409 | A1 | 7/2009 |

OTHER PUBLICATIONS

International Search Report of PCT/JP2019/018670 dated Jul. 23, 2019 [PCT/ISA/210].
Written Opinion of PCT/JP2019/018670 dated Jul. 23, 2019 [PCT/ISA/237].

\* cited by examiner

| TIRE ID | TIRE TYPE | SIZE | BRAND | RESIDUAL GROOVE AMOUNT | WEAR CHARACTERISTIC |
|---|---|---|---|---|---|
| 1 | SUMMER | 275/70R22.5 | ABC | N.A. | A |
| 2 | SUMMER | 275/70R22.5 | ABC | N.A. | A |
| 3 | SUMMER | 275/70R22.5 | ABC | N.A. | A |
| 4 | SUMMER | 275/70R22.5 | ABC | N.A. | A |
| 5 | SUMMER | 275/70R22.5 | ABC | N.A. | A |
| 6 | SUMMER | 275/70R22.5 | ABC | N.A. | A |
| 7 | STUDLESS | 275/70R22.5 | EEE | N.A | C |
| ... | | | | | |
| 11 | ALL SEASONS | 275/70R22.5 | CCC | | B |
| ... | | | | | |
| 21 | STUDLESS | 11/70R22.5 14 | FFF | 10mm | C' |
| ... | | | | | |
| 31 | SUMMER | 275/70R22.5 | ABC | 8mm | A' |

TIRE WEAR PREDICTION SYSTEM, TIRE WEAR PREDICTION PROGRAM, TIRE WEAR PREDICTION METHOD AND DATA STRUCTURE

CROSS REFERENCE TO RELATED APPLICATIONS

This application is a National Stage of International Application No. PCT/JP2019/018670 filed on May 10, 2019, claiming priority based on Japanese Patent Application No. 2018-091256 filed on May 10, 2018.

TECHNICAL FIELD

The present invention relates to a tire wear prediction system and a tire wear prediction program for predicting the wear state of a tire mounted on a vehicle.

BACKGROUND ART

Conventionally, a method for predicting the wear state of a tire mounted on a vehicle such as an automobile has been known.

For example, a method has been established for predicting the wear state (wear life) of a tire on the basis of wear energy at free rolling, at the time applying a toe angle, at the time applying a lateral force, at the time applying a driving force, and at the time applying a braking force, and the wear amount per predetermined traveling distance (See Patent Literature 1).

CITATION LIST

[Patent Literature]
[PTL 1] Japanese Patent No. 3277156

SUMMARY OF INVENTION

According to Patent Literature 1, it is possible to predict the wear state of a tire mounted on a vehicle, that is, the amount of wear of the tire with a certain degree of accuracy. However, the following problems occur in the actual operating environment of the vehicle.

Specifically, in order to prevent uneven wear of a tire mounted on a vehicle and to wear the tire uniformly to some extent, the position of a wheel mounted is generally rotated (tire rotation) during the use.

Since the method for predicting the wear state of the tire predicts the wear state from the new tire mounted at the predetermined wheel position, when the tire rotation is performed as this manner, it becomes difficult to accurately predict the wear amount of the tire.

Furthermore, particularly in the case of a heavy load tire mounted on a truck, a bus or the like, the tire is often replaced with another tire in stock, specifically, a new or used tire, or a tire of a different brand or type (Studless tires, etc.) at the time of tire rotation, and it becomes more difficult to predict the wear amount of the heavy load tire.

Accordingly, an object of the present invention is to provide a tire wear prediction system, a tire wear prediction program, a tire wear prediction method and a data structure capable of accurately predicting the wear state of a tire even when the tire mounted on a vehicle is rotated or replaced with another tire.

One aspect of the present invention is a tire wear prediction system (Tire wear prediction system 100) including a wear prediction unit (Wear prediction unit 110) for predicting a wear state of a tire mounted at a predetermined wheel position of a vehicle (Bus 10) based on a traveling state of the vehicle, a change history acquisition unit (Change history acquisition unit 120) for acquiring a change history including rotation of the wheel position on which the tire is mounted or a content of replacement with another tire, and a wear state correction unit (Wear state correction unit 140) for correcting a reference of the wear state of the tire predicted by the wear prediction unit based on the change history. The wear prediction unit predicts the wear state of the tire based on the reference of the wear state corrected by the wear state correction unit.

One aspect of the present invention is a tire wear prediction program causing a computer to execute a wear prediction process for predicting a wear state of a tire mounted at a predetermined wheel position of a vehicle based on the traveling state of the vehicle, a change history acquiring process for acquiring a change history including rotation of the wheel position on which the tire is mounted or a content of replacement with another tire, and a wear state correction processing for correcting a reference of the wear state of the tire predicted by the wear prediction processing based on the change history. The wear prediction processing predicts the wear state of the tire based on the reference of the previous wear state corrected by the wear state correction processing.

One aspect of the present invention is a tire wear prediction method comprising the steps of a wear prediction step of predicting a wear state of a tire mounted on a predetermined wheel position of a vehicle based on a traveling state of the vehicle, a change history acquiring step of acquiring a change history including the rotation of the wheel position on which the tire is mounted or a content of replacement with another tire, a wear state correction step of correcting a reference of the wear state of the tire predicted by the wear prediction step based on the change history. In the wear predicting step, the tire wear predicting method predicts the wear state of the tire based on the reference of the wear state corrected by the wear state correcting step.

One aspect of the present invention is a data structure used in a tire wear prediction system for predicting a wear state of a tire mounted at a predetermined wheel position of a vehicle based on a traveling state of the vehicle, including a tire ID which is unique identification information imparted to the tire, a type of the tire, a size of the tire, a brand of the tire, a residual groove amount indicating a residual groove depth of a groove formed in a tread, of the tire, and a ware characteristic indicating a characteristic of a tire used for predicting the ware state of the tire. The data structure is used in the tire wear prediction system for a process of correcting a reference of the wear state of the tire predicted by the wear prediction processing based on the change history including the rotation of the wheel position on which the tire is mounted or the content of replacement with another tire.

DESCRIPTION OF EMBODIMENTS

Hereinafter, an embodiment will be described based on the drawings. It should be noted that the same or similar reference numerals are given to the same functions and structures, and the description thereof will be omitted as appropriate.

(1) Overall Schematic Configuration of Tire Wear Prediction System

Figure 1:
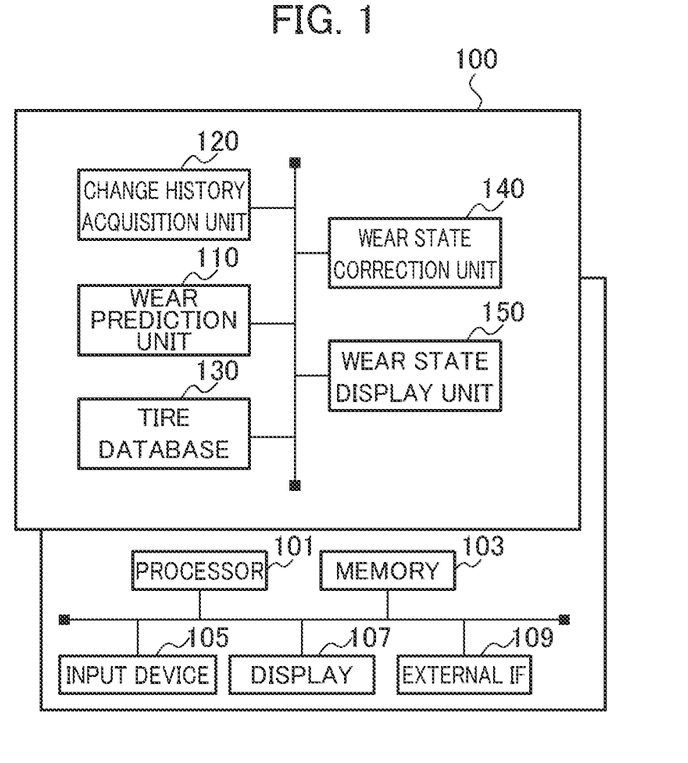
FIG. 1 is a functional block diagram of a tire wear prediction system 100.

FIG. 1 is a functional block diagram of the tire wear prediction system 100. A tire wear prediction system 100 predicts the wear state of a tire mounted at a predetermined wheel position of a vehicle. Specifically, the tire wear prediction system 100 predicts the wear amount from the tire in a new state based on a known prediction method, and accurately predicts the wear amount of the tire even when tire rotation and replacement with another tire are performed.

Figure 2:
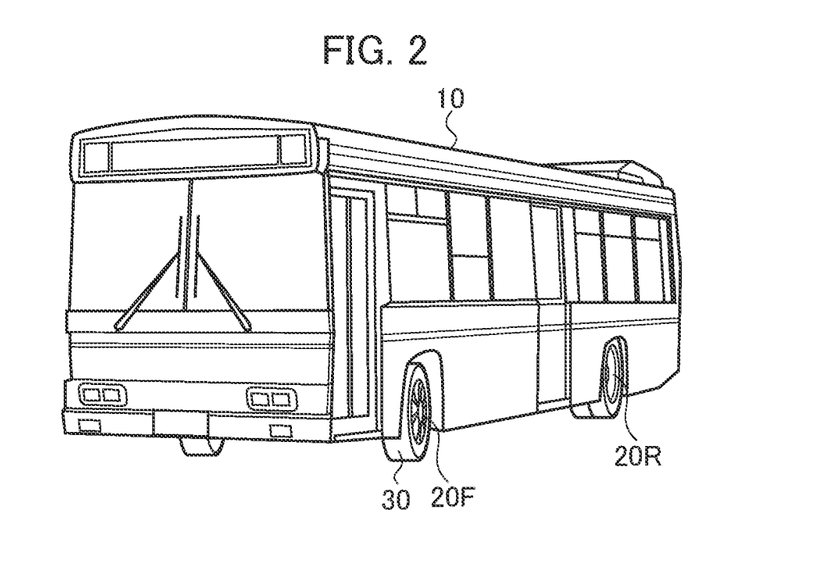
FIG. 2 is a schematic perspective view of a bus 10 mounted with a tire that is an object of the tire wear prediction system 100.

As known prediction methods, in addition to the aforementioned Japanese Patent No. 3277156, Japanese Patent No. 3320653 and Japanese Patent No. 3277155 are cited. However, the prediction method is not limited to these methods, and may be any method as long as the amount of wear of the tire mounted at a predetermined wheel position can be predicted based on the traveling state (Traveling speed, acceleration/deceleration/left-right G, steering angle, load, tire pressure, etc.) of the vehicle, FIG. 2 is a schematic perspective view of a bus 10 equipped with a tire 30 to be an object of the tire wear prediction system 100. As shown in FIG. 2, the bus 10 is a vehicle having two axles, a front wheel axle 20 F and a rear wheel axle 20 R. The front wheel axle 20 F and the rear wheel axle 20 R are mounted with a plurality of tires 30.

The front wheel axle 20 F is a steering axle, and the tire 30 mounted on the front wheel axle 20 F is called a steering wheel (steered, wheel). The rear wheel axle 20 R is a drive axle, and the tire 30 mounted on the rear wheel axle 20 R is called a drive wheel.

The bus 10 is a kind of vehicle to be managed by the tire wear prediction system 100, and is a large vehicle (heavy load vehicle) capable of transporting a large number of passengers. The tire 30 mounted on the bus 10 is a tire for heavy load.

Figure 3:
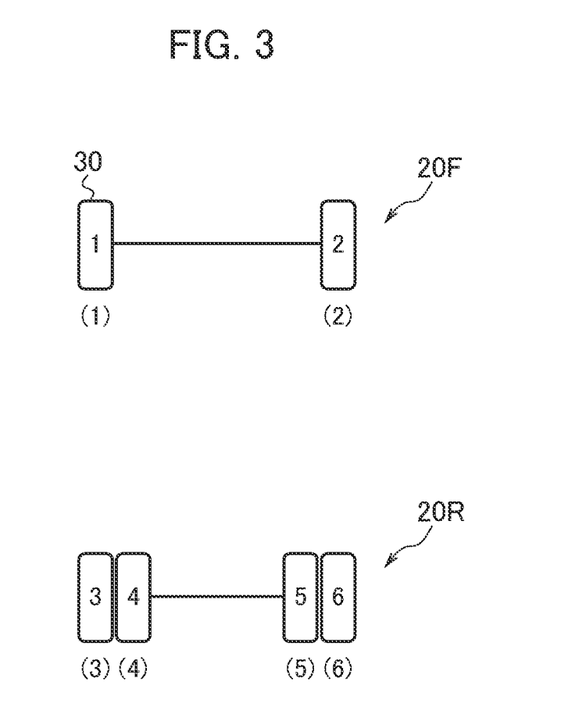
FIG. 3 is an illustration of the axle configuration of bus 10.

The bus 10 includes various sensors for detecting the value of a parameter (See below.) indicating the traveling state of the bus 10. Specifically, the bus 10 includes sensors for detecting the traveling speed, acceleration, deceleration, left and right G, steering angle, load, and tire pressure. These sensors may be shared with the installation of the bus 10 (including tire pressure monitoring systems (TPMS)), or may be installed for predicting the wear state of the tire 30, FIG. 3 is an explanatory diagram of the axle configuration of the bus 10. As shown in FIG. 3, at the wheel position #1 (POS.1, position of front left wheel ((1) in the figure)), the tire 30 identified as Tire 1 is mounted. At the wheel position #2 (POS.2, position of front right wheel ((2) in the figure)), a tire 30 identified as Tire 2 is mounted.

Similarly, each of POS. 3 to 6 (left outer rear wheel, left inner rear wheel, right inner rear wheel, right outer rear wheel, ((3) to (6) in the figure) is mounted with a tire 30 identified as Tire 3-6.

As shown in FIG. 1, the tire wear prediction system 100 includes a wear prediction unit 110, a change history acquisition unit 120, a tire database 130, a wear state correction unit 140, and a wear state display unit 150.

These functional blocks are implemented by executing a computer program (Software) on hardware such as a server computer. Specifically, the tire wear prediction system 100 includes, as hardware elements, a processor 101, a memory 103, an input device 105, a display 107, and an external IF 109.

The wear prediction unit 110 predicts the wear state of the tire 30. Specifically, the wear prediction unit 110 predicts the wear state of the new tire 30 using the known prediction method described above.

More specifically, the wear prediction unit 110 predicts, based on the traveling state of the bus 10 (Vehicle), the wear state of the tire 30 mounted at a predetermined wheel position (Pos. 1-6 in FIG. 3) of the bus 10.

The traveling, state of the bus 10 is a state of the bus 10 determined mainly based on the following parameters. Specifically, Traveling speed, traveling distance, acceleration/deceleration/left-right G, driving force, braking force, lateral force, steering angle, yaw rate, roll rate, pitch rate, load (carrying capacity), and the like can be cited. A wear prediction unit 110 predicts the wear state of the tire 30 by using part or ail of these parameters.

A wear prediction unit 110 acquires a parameter indicating the traveling state of the bus 10 via a communication network. Specifically, the wear prediction unit 110 acquires measurement data from various sensors mounted on the bus 10 via a wireless communication network or a combination of a wireless communication network and a wired communication network.

The wear prediction unit 110 uses the acquired measurement data to predict the wear state of the tire 30 mounted at each wheel position, but the prediction may not necessarily be performed in real time. That is, the prediction of the wear state of the tire 30 may be executed as a batch process every predetermined period (For example, on a daily or weekly basis).

The wear state of the tire 30 is, in short, the wear amount of the tire 30. Based on the predicted wear state of the tire 30, the depth of the groove formed in the tread of the tire 30 (residual groove depth) may be indicated.

The wear prediction unit 110 predicts the wear state of the tire 30 based on a reference of the wear state corrected by the wear state correction unit 140. Specifically, the wear prediction unit 110 acquires the presence/absence of tire rotation or the presence/absence of replacement with another tire from the wear state correction unit 140.

The tire rotation means to change the wheel position of the tire 30 (rotation) mounted on the bus 10 to the other wheel position among the plurality of tires 30 mounted on the bus 10.

Replacement with another tire means replacement with another tire that was not attached to the bus 10 (New or used). This includes changes to different tire brands (Product name, etc.) or types (Summer tires and studless tires (winter tire), etc.).

The wear prediction unit 110, when acquiring the information from the wear state correction unit 140, that is, when acquiring the reference of the corrected wear state, refers to the tire database 130 as necessary, and changes a prediction method of the wear state of the tire 30 and a value of a parameter used for the prediction of the wear state.

Further, when the wear of the tire 30 progresses to a certain degree, the remaining groove depth of the tread is reduced to increase the block rigidity of the tread, and therefore, the wear prediction unit 110 can switch to a prediction method for delaying the progress of the wear state after the wear of the tire 30 progresses to a certain degree (referred to as "tread rigidity modification").

A change history acquisition unit 120 acquires a change history of a tire 30 mounted on the bus 10. Specifically, the change history acquisition unit 120 acquires a change history including the rotation of the wheel position (tire rotation) on which the tire 30 is mounted or the content of replacement with another tire.

The change history may be automatically acquired using the ID of the TPMS measurement unit provided on the tire 30 (Specifically, tire 30 assembled to a rim wheel), or may be acquired by manual or semi-manual input (Use of a hand-held module for reading the ID of the tire 30, etc.) by a user or the like.

The tire database 130 comprises items related to tires 30 that may be mounted on the bus 10.

Figure 5:
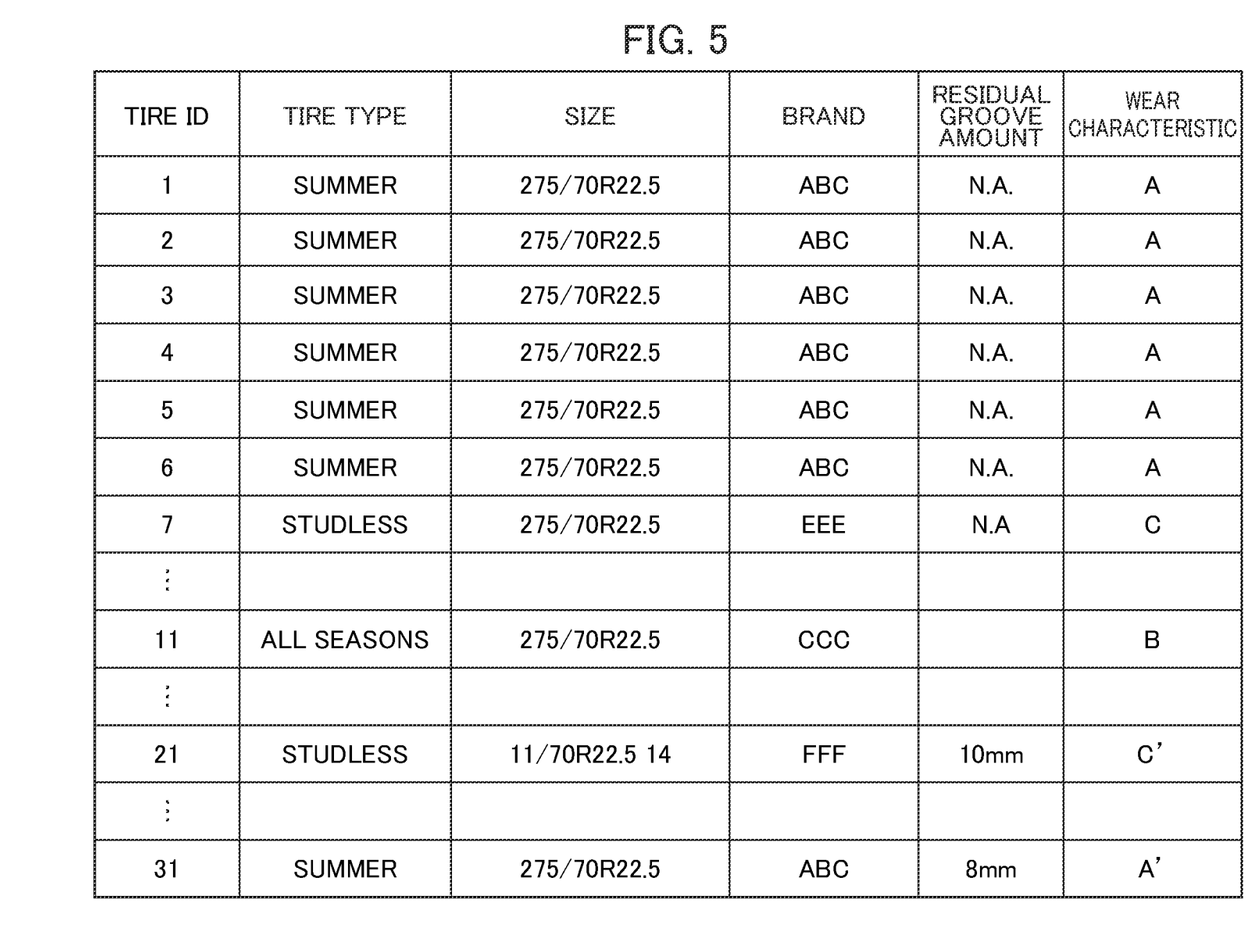
FIG. 5 shows an example of a tire database 130.

FIG. 5 shows an example of the tire database 130. As shown in FIG. 5, the tire database 130 includes items of "Tire ID", "Tire type", "Size", "Brand", "residual groove amount", and "wear characteristic".

The "Tire ID" is unique identification information given to the tire 30. "Tire type" is a type corresponding to the performance of the tire 30 (In FIG. 5, summer, all seasons and studless). The type may depend on the value of rolling resistance, the rigidity of the tread rubber, etc.

"Size" is the size of the tire 30 (tread width, wheel diameter), and "Brand" corresponds to a product name of the tire 30 (brand name), etc. "residual groove amount" is the remaining groove depth of a groove formed in the tread of the tire 30. In the case of a new one, N.A, (Not Applicable) is set.

"wear characteristic" is the characteristic (Tread rubber material and rigidity, etc.) of the tire used to predict the wear state of the tire. The wear characteristics are different depending on the axle on which the tire 30 is mounted (Front axle 20 F (steering axle) or rear axle 20 R (drive axle)).

The tread rigidity correction described above is also performed using the "wear characteristic". For example, "A'" and "C'" in FIG. 5 show wear characteristics after the wear of the tire progresses to a certain degree.

A wear state correction unit 140 corrects the standard of the wear state of the tire 120 predicted by the wear prediction unit 110 based on the change history of the tire 30 acquired by the change history acquisition unit 30.

Specifically, when the change history of the tire 30 is the rotation of the wheel position (Pos. 1-6 in FIG. 3), the wear state correction unit 140 corrects the reference of the wear state based on the wheel position after the rotation. For example, when the tire 30 is moved from the front wheel axle 20 F (POS.1) to the rear wheel axle 20 R (POS.3), the wear characteristics for the steering wheel are changed to the wear characteristics for the driving wheel. Thus, the reference of the wear state of the tire 30 is corrected. In the case of tire rotation, the wear state correction unit 140 may automatically change the wear characteristics by using a parameter indicating the traveling state of the bus 10.

Further, when the change history of the tire 30 is replacement with another tire, the wear state correction unit 140 corrects the standard of the wear state on the basis of at least one of the brand, the type and whether or not the tire is new.

For example, when the tire 30 mounted on the POS.1 is replaced from the summer tire of "ABC" (See tire ID=1 in FIG. 5) to the summer tire of "ABC" (see tire ID=31), the wear state correction unit 140 changes the wear characteristics used for predicting the wear state of the tire 30 from "A" to "A'", As described above, the "A'" indicates the wear characteristics (Tread rigidity has been modified) after the wear of the tire progresses to a certain degree. Thus, the reference of the wear state of the tire is corrected.

An abrasion state display unit 150 displays the abrasion state of the tire 110 predicted by the abrasion prediction unit 30. Specifically, the wear state display unit 150 displays the wear state of the tire 30 for each wheel position.

Figure 6:
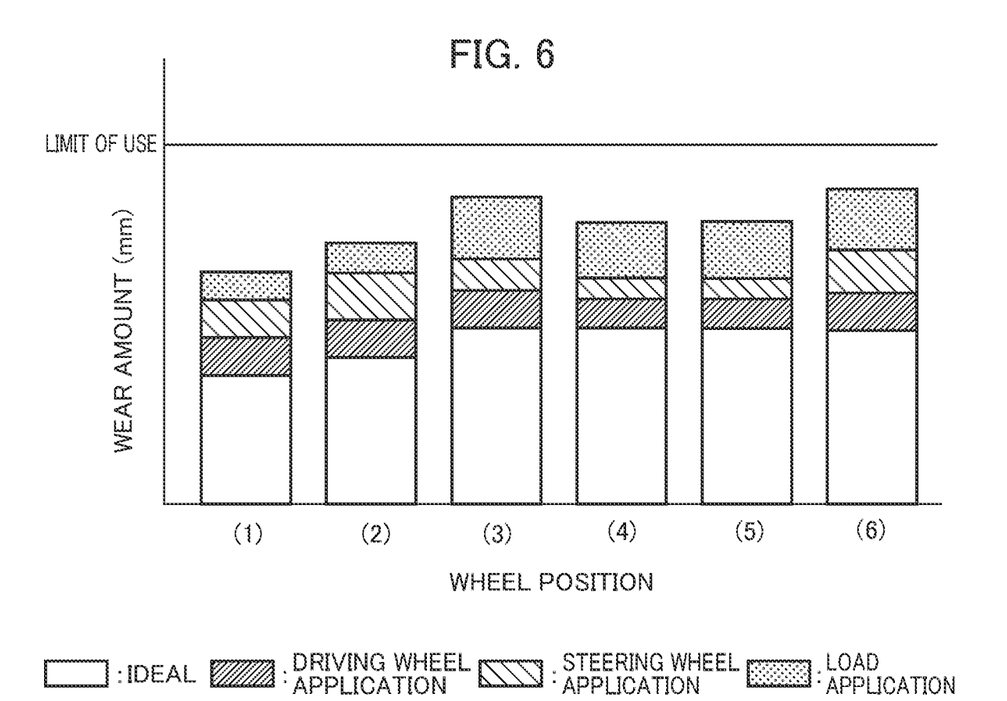
FIG. 6 is a view showing an example of the display of the war wear state of the tire 30 by a wear state display unit 150.

FIG. 6 shows a display example of the wear state of the tire 30 by the wear state display unit 150. The horizontal axes (1) to (6) of the graph shown in FIG. 6 correspond to the wheel positions shown in FIG. 3. The vertical axis of the graph indicates the wear amount (Units: mm) of the tire 30 mounted at each wheel position. The "limit of use" of the wear amount corresponds to the state in which the tread of the tire 30 is worn to the limit in which it can be legally used. Typically, the tread-ware indicator is exposed to the tread surface.

In FIG. 6, "ideal" is an amount of wear when the vehicle travels the distance at the speed in an ideal state where no excessive wear occurs. In other words, the ideal state is an optimum state in which the operation of the bus 10 does not impose an unnecessary burden on the tire. In predicting the wear amount corresponding to the "ideal", the shape of the road on which the bus 10 has actually traveled (Road type, road curvature, etc.) may be taken into consideration.

"driving wheel application" is the amount of wear caused by the driving wheels added to the amount of wear of "ideal". "steering wheel application" is the amount of wear caused by the steering wheel applied to the amount of wear of the "ideal". That is, "driving wheel application" means the wear amount increased by the excessive accelerator operation by the driver, and "steering wheel application" means the wear amount increased by the sudden steering operation by the driver.

"load application" is the amount of wear attributable to the load applied to the amount of wear of the "ideal", Specifically, the amount of wear caused by exceeding the standard loading capacity of the bus 10 (Number of passengers, etc.).

Thus, the wear state display unit 150 can display the wear state of the tire 30 for each wear cause, (2) Operation of Tire Wear Prediction System Next, the operation of the tire wear prediction system 100 will be described. Specifically, the prediction operation of the wear state of the tire 30 by the tire wear prediction system 100 will be described.

Figure 4:
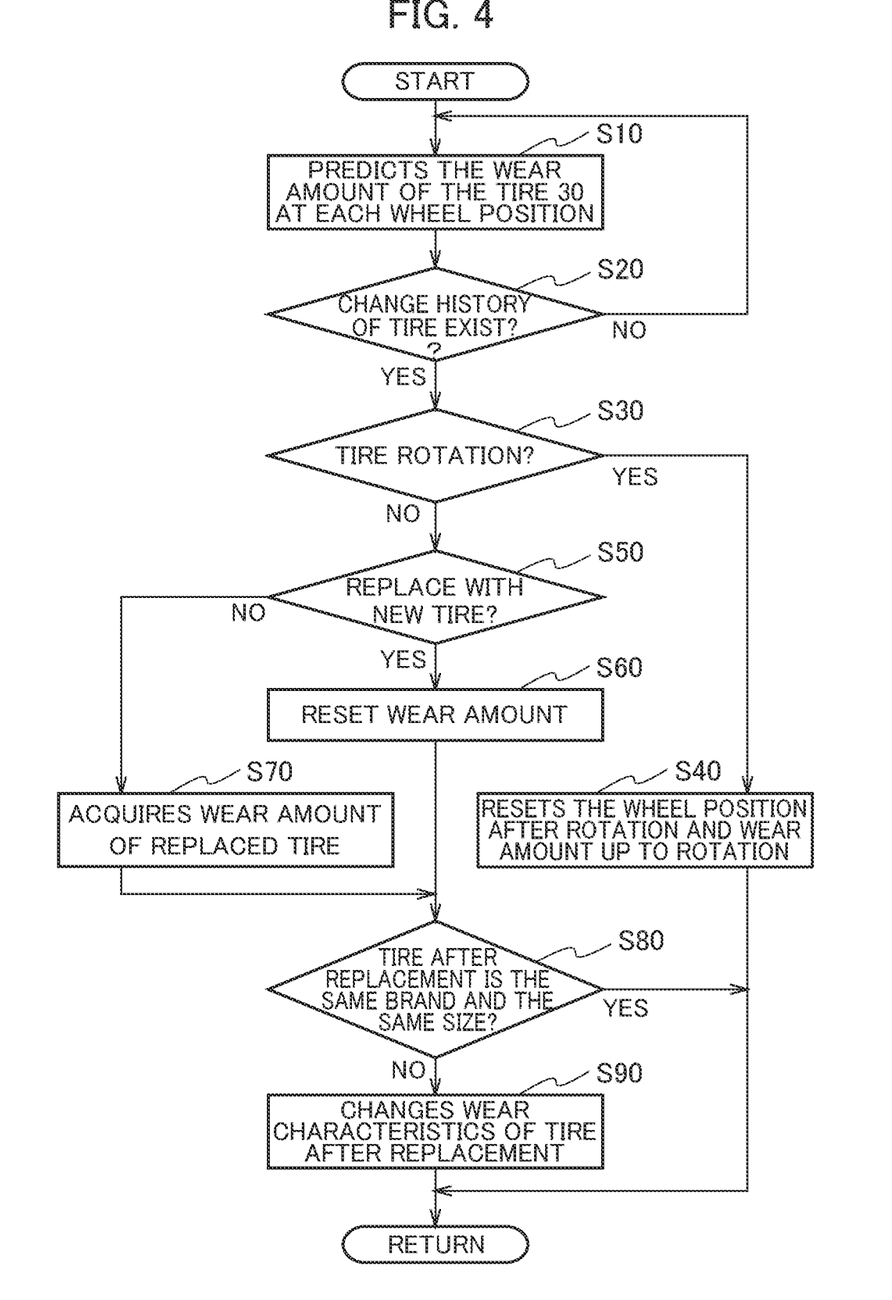
FIG. 4 is a diagram illustrating a predictive operational flow of tire wear state by tire wear prediction system 100 for the tire 30.

FIG. 4 shows a prediction operation flow of the wear state of the tire 30 by the tire wear prediction system 100. As described above, in the present embodiment, the tire 30 mounted on the bus 10 is rotated or replaced with another tire during use.

As shown in FIG. 4, the tire wear prediction system 100 predicts the wear amount of the tire 30 at each wheel position of the bus 10 (S 10). Specifically, as described above, the tire wear prediction system 100 predicts the wear state of the tire using a parameter indicating the traveling state of the bus 10.

Next, the tire wear prediction system 100 checks the existence of the change history of the tire 30 (S 20).

Specifically, the tire wear prediction system 100 checks the presence or absence of tire rotation and replacement with another tire.

When there is a change history of the tire 30, the tire wear prediction system 100 determines whether tar not the change history is a tire rotation (S 30).

In the case of tire rotation, the tire wear prediction system 100 resets the wheel position after rotation and the wear amount of the tire 30 up to the rotation (S 40). The tire wear prediction system 100 changes the wear characteristics (Steering or driving axle-related, see description of FIG. 5) of the tire 30 as necessary based on the wheel position after rotation.

When the tire is not rotated, that is, when the tire is replaced with another tire, the tire wear prediction system 100 determines whether or not the tire is replaced with a new tire (S 50).

In the case of replacement with a new tire, the tire wear prediction system 100 resets the wear amount of the tire 30 at the wheel position (S 60).

On the other hand, in the case of replacement with a used tire, that is, replacement with a tire worn over a certain degree, the tire wear prediction system 100 acquires the wear amount of the replaced tire (S 70). The replaced tire is both a tire 30 mounted on the bus 10 before replacement and a used tire newly mounted on the bus 10. Thus, the wear amount of the removed tire 30 can be displayed and the wear state of the used tire can be accurately predicted.

The tire wear prediction system 100 determines whether the tire after replacement is the same brand and the same size as the tire 30 before replacement (S 80).

When the tire after replacement is not the same brand and the same size as the tire 30 before replacement, that is, when any of the type, brand or size is different, the tire wear prediction system 100 changes the wear characteristics (See the description associated with FIG. 5) of the tire 30 after replacement (S 90). Specifically, the tire wear prediction system 100 changes the wear characteristics corresponding to the brand and size of the replaced tire 30.

Figure 7:
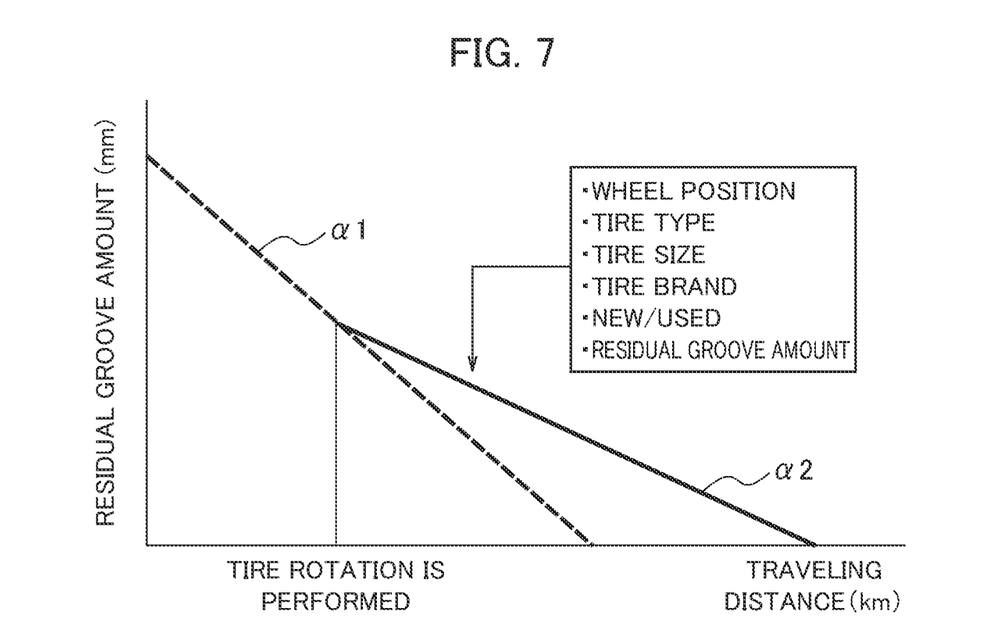
FIG. 7 is a diagram conceptually illustrating the prediction of wear state of the tire 30 by tire wear prediction system 100.

FIG. 7 conceptually shows the prediction of the wear state of the tire 30 by the tire wear prediction system 100. As shown in FIG. 7, the tire wear prediction system 100 starts predicting the wear state of the tire 30. Here, a new tire 30 is mounted on the bus 10.

The tire wear prediction system 100 predicts the wear state of the tire 10 based on the traveling state (Traveling speed, acceleration/deceleration/left-right G, steering angle, load, tire pressure, etc.) of the bus 30. As a result, it is predicted that the amount of residual (remaining) groove amount (residual groove depth) of the tire decreases along the straight line $\alpha 1$.

Thereafter, the tire rotation of the tire 30 is performed. As described above, the tire wear prediction system 100 changes the wear characteristics used for predicting the wear state of the tire. 30 based on the wheel position, tire type, size, brand (including distinction between new and used), and residual groove amount (Used) on which the tire 30 is mounted.

As a result, it is predicted that the remaining groove amount decreases along the straight line $\alpha 2$ after the tire natation.

In addition, the tire wear prediction system 100 can display the wear state of the tire 30 as shown in FIG. 6 at any timing of the above-described steps 10 to 90.

(3) Function and Effects

According to the embodiment described above, the following effects can be obtained. Specifically, the tire wear prediction system 100 corrects the reference (Tire rotation or replacement with another tire) of the predicted wear state of the tire 30 based on the acquired change history (wear characteristic) of the tire 30. The tire wear prediction system 100 predicts the wear state of the tire 30 based on the reference of the corrected wear state.

Therefore, even when the tire 30 mounted on the bus 10 is rotated or replaced with another tire, the wear state of the tire 30 can be accurately predicted using a known prediction method.

In particular, commercial vehicles such as trucks and buses have high frequency of tire rotation and replacement with other tires, and are often replaced with new or used tires or tires of different brand or type (Studless tires, etc.). The tire wear prediction system 100 can accurately predict the wear state of the tire 30 even in such a case because it corresponds to both tire rotation and replacement with another tire.

In the present embodiment, the tire wear prediction system 100 can display the wear state of the tire 30 for each wear cause (see FIG. 6). Therefore, the driver of the bus 10 and the operating body of the bus 10 (Bus companies, etc.) can promote the operation of the bus 10 and the it of the operating method of the bus 10. Thus, the wear life of the tire 30 can be extended.

Other Embodiments

While the contents of the present invention have been described in accordance with the above embodiments, it will be apparent to those skilled in the art that the present invention is not limited to these descriptions and that various modifications and improvements are possible.

For example, in the embodiment described above, the tire for heavy load mounted on the bus 10 has been described as an example, but it may be a large-sired vehicle other than the bus such as a truck or a vehicle (Especially for business use).

In the above-described embodiment, the tire wear prediction system 100 corresponds to the tire rotation and the replacement with another tire, but may correspond to only one of the tire rotation and the tire replacement depending on the type of the target vehicle.

In the above-described embodiment, the tire wear prediction system 100 displays the wear state of the tire 30 according to the cause of wear, but such display is not essential. Further, it is possible to indicate only a part of a plurality of causes of wear.

Although embodiments of the invention have been described as described above, the discussion and drawings which form part of this disclosure should not, be construed as limiting the invention. Various alternative embodiments, embodiments and operational techniques will be apparent to those skilled in the art from this disclosure.

REFERENCE SIGNS LIST

10 Bus
20 F Front wheel axle
20 R rear wheel axle
30 Tire
100 Tire wear prediction system
101 Processor
103 Memory
105 Input device
107 Display
109 External IF
110 Wear prediction unit 120 Change history acquisition unit
130 Tire database
140 Wear state correction unit
150 Wear state display unit

The invention claimed is:

1. A tire wear prediction system, comprising:
a wear prediction unit for predicting a wear state of a tire mounted at a predetermined wheel position of a vehicle based on a traveling state of the vehicle;
a change history acquisition unit for acquiring a change history including rotation of the wheel position on which the tire is mounted or a content of replacement with another tire;
a wear state correction unit for correcting a reference of the wear state of the tire predicted by the wear prediction unit based on the change history; and
a wear state display unit for displaying the wear state predicted by the wear prediction unit, wherein
the wear prediction unit predicts the wear state of the tire based on the reference of the wear state corrected by the wear state correction unit, and
the wear state display unit displays the wear state for each type of wear cause.

2. The tire wear prediction system according to claim 1, wherein the wear state correction unit corrects the reference of the wear state based on the wheel position after the rotation when the change history is the rotation of the wheel position.

3. The tire wear prediction system according to claim 2, wherein the wear state correction unit corrects the reference of the wear state based on at least one of a brand, a type, and a new tire or not when the change history is a change to another tire.

4. The tire wear prediction system according to claim 2, wherein the tire wear prediction system comprises a wear state display unit for displaying the wear state predicted by the wear prediction unit; wherein
the wear state display unit displays the wear state for each wear cause.

5. The tire wear prediction system according to claim 1, wherein the wear state correction unit corrects the reference of the wear state based on at least one of a brand, a type, and a new tire or not when the change history is a change to another tire.

6. The tire wear prediction system according to claim 5, wherein the tire wear prediction system comprises a wear state display unit for displaying the wear state predicted by the wear prediction unit; wherein
the wear state display unit displays the wear state for each wear cause.

7. A tire wear prediction program causing a computer to execute:
a wear prediction process for predicting a wear state of a tire mounted at a predetermined wheel position of a vehicle based on the traveling state of the vehicle;
a change history acquiring process for acquiring a change history including rotation of the wheel position on which the tire is mounted or a content of replacement with another tire; and
a wear state correction process for correcting a reference of the wear state of the tire predicted by the wear prediction process based on the change history; and
a wear state display process for displaying the wear state predicted by the wear prediction process, wherein
the wear prediction process predicts the wear state of the tire based on the reference of the previous wear state corrected by the wear state correction process, and
the wear state display process displays the wear state for each type of wear cause.

8. A tire wear prediction method comprising the steps of:
a wear prediction step of predicting a wear state of a tire mounted on a predetermined wheel position of a vehicle based on a traveling state of the vehicle;
a change history acquiring step of acquiring a change history including the rotation of the wheel position on which the tire is mounted or a content of replacement with another tire;
a wear state correction step of correcting a reference of the wear state of the tire predicted by the wear prediction step based on the change history; and
a wear state display step for displaying the wear state predicted by the wear prediction step, wherein
in the wear predicting step, the tire wear predicting method predicts the wear state of the tire based on the reference of the wear state corrected by the wear state correcting step, and
in the wear state display step, the wear state for each type of wear cause is displayed.

9. A data structure used in a tire wear prediction system for predicting a wear state of a tire mounted at a predetermined wheel position of a vehicle based on a traveling state of the vehicle; including:
a tire ID which is unique identification information imparted to the tire;
a type of the tire;
a size of the tire;
a brand of the tire;
a residual groove amount indicating a residual groove depth of a groove formed in a tread of the tire; and
a wear characteristic indicating a characteristic of a tire used for predicting the wear state of the tire; wherein
the data structure is used in the tire wear prediction system for:
a process of correcting a reference of the wear state of the tire predicted by a wear prediction process based on the change history including the rotation of the wheel position on which the tire is mounted or the content of replacement with another tire; and
a wear state display process for displaying the wear state predicted by the wear prediction process, wherein
the wear prediction process predicts the wear state of the tire (30) based on the reference of the previous wear state corrected by the wear state correction process, and
the wear state display process displays the wear state for each type of wear cause.

* * * * *